Figure 1:
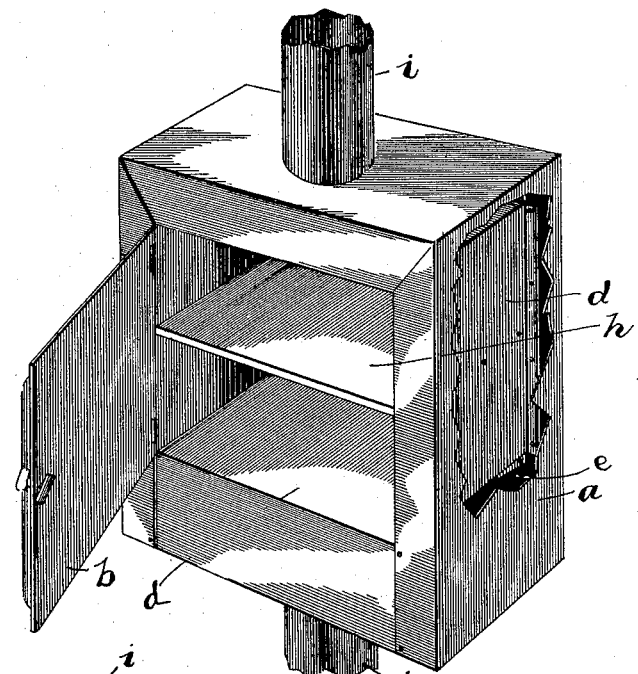

No. 612,954. Patented Oct. 25, 1898.
G. R. MOON.
COMBINED COOKING AND WARMING ATTACHMENT FOR STOVE OUTLET PIPES.
(Application filed Feb. 3. 1898.)

(No Model.)

WITNESSES:
H. B. Bradshaw
J. P. James

INVENTOR
George R. Moon
BY
C. C. Shepherd
ATTORNEY

UNITED STATES PATENT OFFICE.

GEORGE R. MOON, OF COLUMBUS, OHIO.

COMBINED COOKING AND WARMING ATTACHMENT FOR STOVE OUTLET-PIPES.

SPECIFICATION forming part of Letters Patent No. 612,954, dated October 25, 1898.

Application filed February 3, 1898. Serial No. 668,968. (No model.)

*To all whom it may concern:*

Be it known that I, GEORGE R. MOON, a citizen of the United States, residing at Columbus, in the county of Franklin and State of Ohio, have invented a certain new and useful Improvement in a Combined Cooking and Warming Attachment for Stove Outlet-Pipes, of which the following is a specification.

My invention relates to the improvement of warming and cooking attachments for stove outlet-pipes of that class in which are provided an inner and an outer casing, with a space between them for the passage of the products of combustion, and an inclined deflector near the lower end; and the novelty resides in the peculiarities of construction, as more fully hereinafter described, shown in the drawings, and then particularly pointed out in the appended claim.

Figure 2:
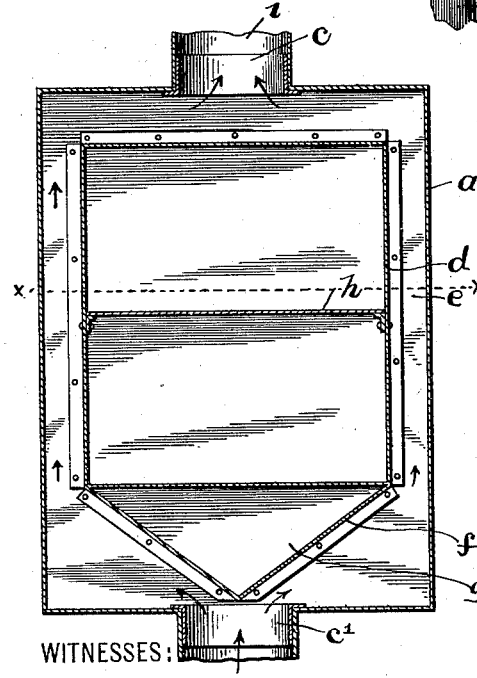
Figure 3:
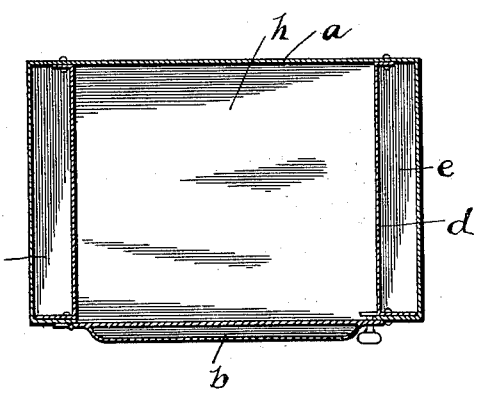

Figure 1 is a view in perspective of my improved device, showing the same in connection with a portion of a stovepipe and for the sake of clearness showing a part of one side of the casing broken away. Fig. 2 is a central vertical section of the same, and Fig. 3 is a transverse section.

Similar letters refer to similar parts throughout the several views.

In the construction of my improved warming device I provide an external casing $a$ of sheet metal or suitable material, the latter being substantially of the box form shown and being provided on its forward side with a doorway which is adapted to be closed by a door $b$. This external casing $a$ is provided in its upper end with an outlet-opening, from which projects upwardly and outwardly a short pipe-arm $c$. In the lower end portion or bottom of the casing $a$ I provide a similar opening and a similar pipe projection $c'$.

Within the external casing $a$ I provide an internal casing or compartment $d$, the latter extending from the rear to the front side of the outer casing $a$ and having its forward side open to communicate with the doorway of said external casing. The internal casing $d$ is of such height and width as to result in the production of a continuous flue or space $e$ about the sides, top, and bottom thereof. With the bottom or lower side of the internal casing I provide a downward extension or deflector $f$, which also extends from the back to the front of the casing $a$ and which, as shown, is V shape in cross-section and results in the formation of a closed air-chamber $g$. Within the inner casing $d$ I provide one or more suitable shelves $h$.

The internal casing is flanged, as shown, the flanges at the front being longer than those at the back, as shown clearly in Fig. 3, the longer flanges at the front being of a width equal to that of the side flues $e$, to the front walls of which they are secured. These flanges serve to strengthen the device at these points where there is the greatest danger of injury by reason of the liability of hitting the wall or corners in putting things in or taking them from the oven. They serve, further, to strength and brace the internal casing and prevent its being easily bent inward or dented by the contact therewith of dishes and the like as they are placed in the oven. This manner of affixing the internal casing in place dispenses with all interior braces or connections and leaves the flues unimpeded.

The device constructed as above described is adapted to be made to intersect the vertical outlet-pipe $i$ of a cooking or other stove, the sections of said pipe $i$ being made to engage, respectively, with the outlet-pipe arms $c$ and $c'$ of the casing $a$.

It is obvious that the heat and smoke which rise from the stove through the lower pipe-section $i$ must in reaching the upper outlet-pipe section $i$ pass through the flue or space $e$, thus subjecting the dishes or other articles which may be supported upon the shelves $h$ to a degree of heat sufficient to properly warm said articles. It is evident that by closing the door $b$ a sufficient heat may be generated within the inner compartment for the purpose of cooking therein and that the heat given off by the outer surface of the casing $a$ may be utilized to warm the room in which the same is used.

In entering the flue $e$ it is obvious that the heat will come into contact with the inclined plates of the extension $f$ and that these plates will serve to separate the volume of incoming heat and deflect it toward the sides of the casing. It will also be seen that the substantially V-shaped deflector will serve the double purpose of equalizing the distribution of and preventing too great a degree of heat from being imparted to the bottom of the inner casing.

It is obvious that an attachment such as herein described may be produced at a reasonable cost of manufacture and that the same may be readily connected with any of the ordinary stove outlet-pipes regardless of whether the same be a heating or cooking stove.

Having now fully described my invention, what I claim, and desire to secure by Letters Patent, is—

The herein-described warming attachment for stove outlet-pipes, the same consisting of the external casing having upper and lower openings and pipes affixed therein, the internal casing having flanges secured to the rear wall of the outer casing and longer flanges secured to the front wall and extending to the side walls thereof, thus bracing and strengthening the oven at the front corners and forming unimpeded flues at the sides and top, the internal casing having a substantially V-shaped extension at the lower end thereof, forming a dead-air space beneath the bottom of the internal chamber, with its apex at the bottom of the outer casing at the opening therein, all substantially as herein shown and described.

GEORGE R. MOON.

In presence of—
A. L. PHELPS,
EDWARD M. TAYLOR.